June 20, 1950 J. D. REID 2,512,553

PROJECTION TELEVISION RECEIVER CABINET

Filed Dec. 8, 1948

INVENTOR.
John D. Reid
BY Alden D. Redfield
ATTORNEY

Patented June 20, 1950

2,512,553

UNITED STATES PATENT OFFICE 2,512,553

PROJECTION TELEVISION RECEIVER CABINET

John Drysdale Reid, Cincinnati, Ohio, assignor to Avco Manufacturing Corporation, Cincinnati, Ohio, a corporation of Delaware Application December 8, 1948, Serial No. 64,105

1 Claim. (Cl. 178—7.5)

Figures 1, 2:
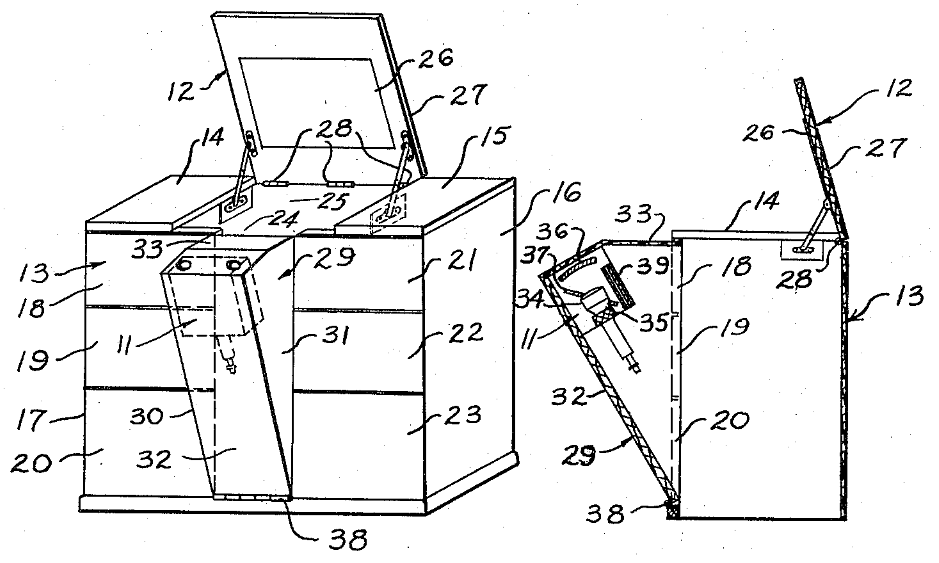

The present invention relates generally to television receiver cabinets and specifically to a projection-type television receiver cabinet construction.

One of the major problems in the television industry today is to provide cabinets, particularly for combination type receivers, which present a compact appearance and a minimum of bulk when not in use. The expression "combination set" is understood to mean an arrangement which includes a television receiver and/or a phonograph or radio receiver. The present invention is directed to these objectives, and it provides improvements over present cabinet constructions.

The primary object of the present invention is to provide a projection television receiver cabinet construction wherein the screen and projection apparatus may be compactly stored when not in use, in such a manner that no unsightly discontinuities are presented, and quickly set up for operation.

Figure 3:
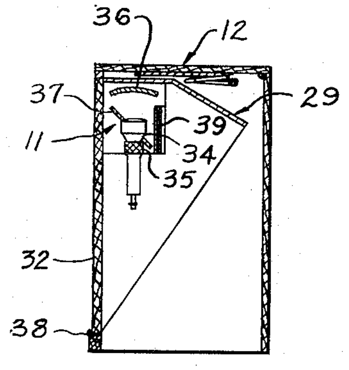

For a better understanding of the present invention, together with other and further objects, advantages and capabilities thereof, reference is made to the following description of the accompanying drawing, in which there is illustrated a preferred embodiment of television receiver cabinet construction in accordance with the present invention. In the drawings:

Fig. 1 is a perspective view of a novel combination receiver cabinet construction in accordance with the present invention, showing the parts in the operating position, and Figs. 2 and 3 are side elevational sectional views of the Fig. 1 construction, showing the parts in operating and storage positions, respectively.

In Fig. 1 there is shown, in combination in a television receiver, a projector unit 11, a screen unit 12, and a cabinet 13, which has a top consisting of panels 14 and 15, a pair of side walls consisting of panels 16 and 17, and a front consisting of panels 18, 19, 20, 21, 22, and 23. Panels 20 and 23 are preferably outwardly swingable to provide part of the enclosures for record albums. Panel 21 is preferably a part of the enclosure for the television chassis and its control knobs. Panel 19 is a part of the enclosure for a phonograph, and panel 18 is a part of the enclosure for an AM radio receiver or the like. I do not desire to be limited to any particular relationship or utility for the panels 18, 19, 20, 21, 22, and 23. It is of the essence only that there be provided a front having an opening 24 therein. The top is provided with an opening 25 between the panels 14 and 15. The receiver includes a reflecting screen 26 carried by a panel 27. This panel is of a size and shape substantially identical with that of the opening in the top, and it is mounted on suitable hinges 28 at the rear of the top so that it can be rotated rearwardly to approximate the position shown in Fig. 1 for its normal operation or rotated forwardly into surface continuity with top panels 14 and 15 for storage.

The projector unit 11 is mounted in an enclosure 29 which comprises triangular shaped side members 30 and 31 and a rectangular shaped front member 32 and a slightly peaked top member 33. The front panel 32 is of a size and shape substantially identical with that of the opening in the front of the cabinet, and it is supported on a hinge 38 in such a way that the projector unit may be tilted outwardly from the front for normal operation and tilted rearwardly for storage of the projector unit. In the latter event, panel 32 is substantially in surface continuity with panels 18, 19, 20, 21, 22, and 23. The projector is per se old and well known in the art and is known as a "Norelco Protelgram, Model 160," manufactured by the North American Philips Company, Television Division, 100 East 42nd Street, New York 17, New York. It comprises a picture tube 34, a deflector 35, a spherical mirror 36, a 45° mirror 37, and a corrector lens 39, all so constructed and arranged as to project rays through the corrector lens onto the screen 26.

The primary advantages of the present construction are as follows:

(1) The screen and projector units are compactly stored so that no unsightly discontinuities are presented;

(2) The screen and projector units are readily and quickly set up for operation by manual rotation in opposite directions;

(3) The projector and screen units consume a minimum of space when not in operation, since they disappear into the main cabinet, as shown by the dashed lines (Fig. 2).

The operation of the invention will, in the light of the foregoing description, be apparent to those skilled in the art, particularly to those having an acquaintance with the North American Philips projection system, Marvel Patent 1,761,019 and Zworykin Patent 1,870,702.

Thus it will be seen that the invention provides, in a television receiver of the type having a cabinet provided with an apertured front and top, the combination of a screen unit, a housed projector unit, and means for rotating the screen and projector units in opposite directions relative to parallel axes, away from each other to place the screen and projector units into operative relationship and toward each other to place the screen and projector units in protective storage.

Having thus described my invention, I claim:

In combination in a projection-type television receiver a cabinet formed as a parallelepiped with top, front, bottom, rear, and two side walls, said top and front being provided with central openings, a disappearing bin formed with a front wall and a top wall and a pair of inverted triangular side walls, the front wall of said bin being shaped to conform to the opening in the front of said cabinet and to be substantially continuous therewith when the bin is in disappearing position, supporting means adjacent the front and bottom walls of said cabinet for swingably mounting said bin to permit manual tilting of the bin between a storage position and an operating position whereat the bin front wall extends diagonally outwardly relative to the cabinet front wall, a folded Schmidt reflective television image projector mounted within said bin adjacent the top of the front wall thereof, said projector having an upwardly extending cathode-ray tube mounted parallel to the bin front wall, a spherical mirror mounted with its concave surface facing said tube, a corrector lens mounted rearwardly of said tube and parallel to the bin front wall, and a 45 degree mirror for directing the image through said corrector lens and diagonally upwardly and rearwardly when the bin is in operating position, a lid member shaped to conform to the opening in the top of said cabinet and to be substantially continuous therewith when the lid is in closed position, supporting means adjacent the rear and top walls of said cabinet for swingably mounting said lid to permit manual tilting of the lid between a closed position and an operating position whereat the lid extends diagonally upwardly and forwardly in the same general direction as said corrector lens extends when the bin is in operating position, and a reflecting screen mounted on that surface of said lid which is presented to the front when the lid is open, said screen being positioned in the path of the light rays from said projector.

JOHN DRYSDALE REID.

REFERENCES CITED

The following references are of record in the file of this patent:

UNITED STATES PATENTS

| Number | Name | Date |
|---|---|---|
| 1,643,670 | Loughridge | Sept. 27, 1927 |
| 2,446,214 | Cramer | Aug. 3, 1948 |
| 2,474,297 | Young | June 28, 1949 |

FOREIGN PATENTS

| Number | Country | Date |
|---|---|---|
| 108,434 | Sweden | Sept. 14, 1943 |
| 370,897 | France | Feb. 21, 1907 |
| 436,301 | Great Britain | Oct. 9, 1935 |